United States Patent
Pasquier et al.

(10) Patent No.: US 11,324,155 B2
(45) Date of Patent: May 10, 2022

(54) METHOD FOR CONTROLLING OPERATION OF AN AGRICULTURAL SYSTEM AND AGRICULTURAL SYSTEM

(71) Applicant: Kverneland Group Les Landes Génusson S.A.S., Les Landes Génusson (FR)

(72) Inventors: Gaëtan Pasquier, Sainte Cécile (FR); Janny Poulard, Saint hilaire de Loulay (FR)

(73) Assignee: Kverneland Group Les Landes Génusson S.A.S., Les Landes Génusson (FR)

( * ) Notice: Subject to any disclaimer, the term of this patent is extended or adjusted under 35 U.S.C. 154(b) by 257 days.

(21) Appl. No.: 16/625,013

(22) PCT Filed: Jun. 29, 2018

(86) PCT No.: PCT/EP2018/067577
§ 371 (c)(1),
(2) Date: Dec. 20, 2019

(87) PCT Pub. No.: WO2019/002545
PCT Pub. Date: Jan. 3, 2019

(65) Prior Publication Data
US 2020/0146199 A1   May 14, 2020

(30) Foreign Application Priority Data
Jun. 30, 2017  (EP) .................................... 17179108

(51) Int. Cl.
*A01B 63/112*   (2006.01)
*A01B 63/14*   (2006.01)
(Continued)

(52) U.S. Cl.
CPC .......... *A01B 63/112* (2013.01); *A01B 59/042* (2013.01); *A01B 63/1006* (2013.01);
(Continued)

(58) Field of Classification Search
CPC . A01B 63/112; A01B 63/145; A01B 63/1006; A01B 59/042; A01B 67/00; B60D 1/465
See application file for complete search history.

(56) References Cited

U.S. PATENT DOCUMENTS

2002/0112864 A1*  8/2002  Scarlett et al. ........ A01B 67/00
                                                        172/3
2015/0305228 A1* 10/2015  Zemenchik ............ A01B 63/32
                                                        701/50
2017/0066448 A1   3/2017  Hertel

FOREIGN PATENT DOCUMENTS

DE        102011076296 A1   11/2012
EP            1889531 B1    4/2010
(Continued)

OTHER PUBLICATIONS

European Patent Office Search Report dated Jan. 9, 2020, in reference to co-pending European Patent Application No. PCT/EP2018/067577 filed Jun. 29, 2018.

*Primary Examiner* — Tara Mayo-Pinnock
(74) *Attorney, Agent, or Firm* — Leason Ellis LLP

(57) ABSTRACT

The present disclosure refers to a method for controlling operation of an agricultural system, comprising a tractor; an implement (100) hitched through a draw bar (10) to the tractor, the implement (100) having working tools (31) configured to engage with a ground and/or an agricultural product in operation while the tractor is drawing the implement (100) over a field; and a control system, comprising a control unit (2) and a sensor arrangement (1) connected to the control unit (2) through a control bus (5), wherein the control unit (2) is configured to determine a draft force
(Continued)

Figure 1:
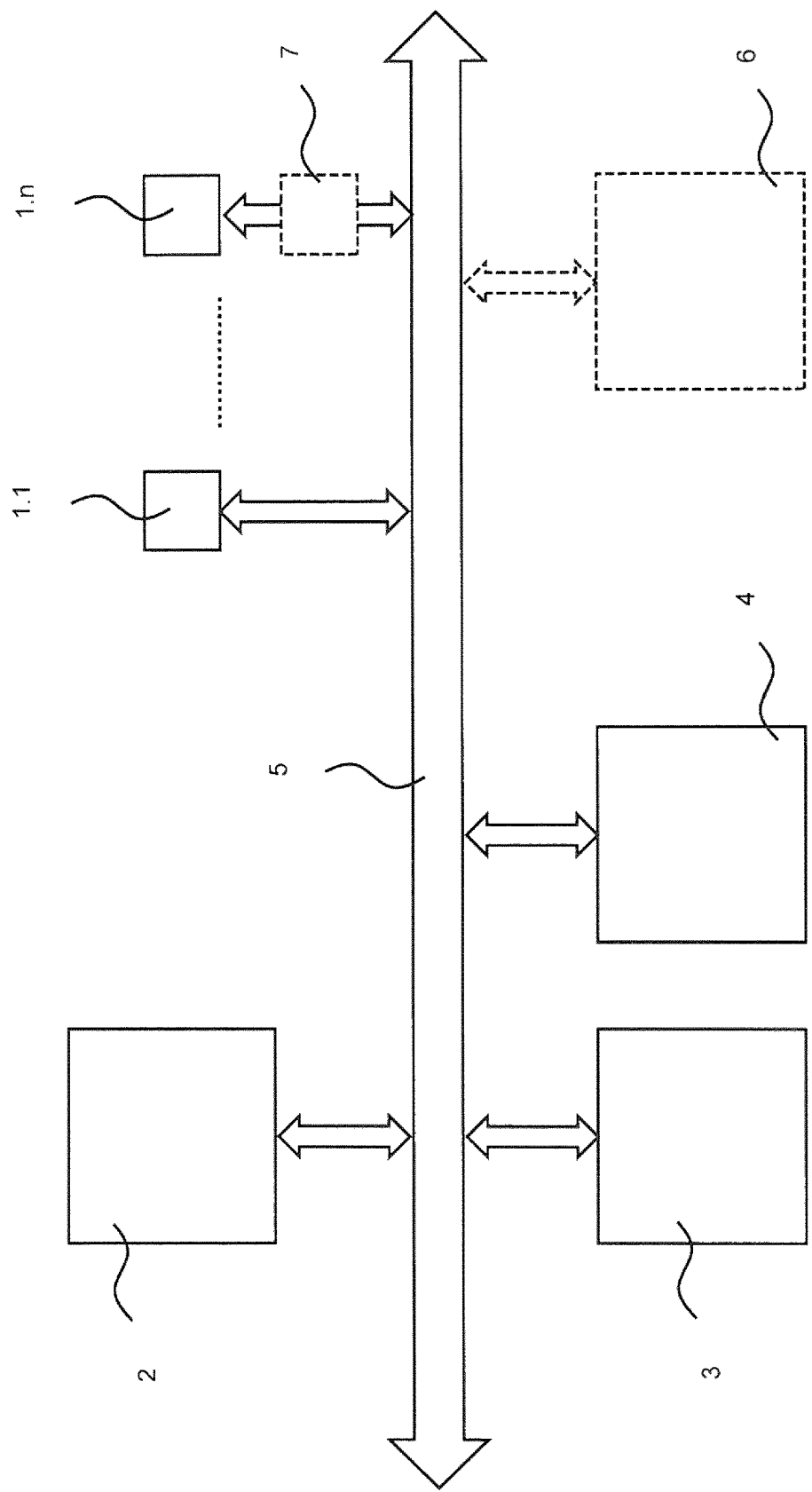

applied to the implement (100) through the draw bar from measurement signals detected by the sensor arrangement (1); the method comprising operating the implement in either normal mode or field transport mode of operation based on different draft force thresholds.

15 Claims, 9 Drawing Sheets

(51) Int. Cl.
*A01B 63/10* (2006.01)
*A01B 67/00* (2006.01)
*A01B 59/042* (2006.01)
*B60D 1/46* (2006.01)

(52) U.S. Cl.
CPC ............ *A01B 63/145* (2013.01); *A01B 67/00* (2013.01); *B60D 1/465* (2013.01)

(56) References Cited

FOREIGN PATENT DOCUMENTS

| EP | 2499893 | A1 | 9/2012 |
| EP | 2546627 | A2 | 1/2013 |
| EP | 3011815 | A1 | 4/2016 |
| EP | 3050416 | A1 | 8/2016 |

\* cited by examiner

METHOD FOR CONTROLLING OPERATION OF AN AGRICULTURAL SYSTEM AND AGRICULTURAL SYSTEM

The present disclosure refers to a method for controlling operation of an agricultural system and an agricultural system.

BACKGROUND

Such agricultural system may be provided with a tractor and an implement hitched through a drawbar to the tractor. The implement is having working tools configured to engage with a ground in operation while the tractor is drawing or pulling the implement over a field. Examples for implements may include cultivator, windrower, seeder, mower, disc harrow, tine harrow, and plough. While the implement is pulled by the tractor on the field, a draft force applied to the draw bar may vary in dependence on field conditions. In case of overload of the draft force, there may be damage to the implement, specifically to the working tools and/or other structural members of the implement.

Document EP 2 546 627 A2 discloses a system and a method for determining the magnitude and direction of the draft force applied to the drawbar of a tractor by a towed implement. Orthogonal load sensors are placed at the drawbar pivot point to measure load on the drawbar. From the measured load on the drawbar, the lateral and longitudinal draft forces applied by the towed implement on the drawbar are calculated. The magnitude and direction of the draft force is then determined from the calculated lateral and longitudinal forces.

Document EP 1 889 531 B1 discloses a method of using of a CAN bus engine torque/speed message as load feedback in an agricultural system provided with a tractor pulling a ground-engaging implement.

SUMMARY

It is an object of the present disclosure to provide a method for controlling operation of an agricultural system comprising a tractor and an implement hitched to the tractor and an agricultural system with improved safety functionality for avoiding damage to the agricultural system.

For solving the problem, a method for controlling operation of an agricultural system and an agricultural system according to the independent claims 1 and 13, respectively, is provided. Alternative embodiments are referred to in dependent claims.

According to an aspect, a method for controlling operation of an agricultural system is provided. The agricultural system is comprising: a tractor; an implement hitched through a draw bar to the tractor, the implement having working tools configured to engage with a ground and/or an agricultural product in operation while the tractor is drawing the implement over a field; and a control system, comprising a control unit and a sensor arrangement connected to the control unit through a control bus, wherein the control unit is configured to determine a draft force applied to the implement through the draw bar from measurement signals detected by the sensor arrangement. The method is comprising: Providing a first draft force threshold in the control unit; providing a second draft force threshold in the control unit, the second draft force threshold being assigned a draft force which is higher than a draft force assigned to the first draft force threshold; operating the implement in a normal mode of operation in which the working tools engage with the ground while the tractor is drawing the implement over the field; determining, by the control unit, that a present first draft force derived from first measurement signals detected by the sensor arrangement is higher than the first draft force threshold; in response to the determining, providing a warning signal in the control unit, and outputting the warning signal to a user through an output device connected to the control unit; determining, by the control unit, that a present second draft force derived from second measurement signals detected by the sensor arrangement is higher than the second draft force threshold; and in response to the determining, providing a switch control signal in the control unit; outputting the switch control signal to an implement control unit; and in response to the switch control signal, switching operation of the implement into a field transport mode of operation in which the working tools are disengaged from the ground by lifting up the working tools while the tractor is drawing the implement over the field.

According to another aspect, an agricultural system is provided, the agricultural system comprising: a tractor; an implement hitched through a draw bar to the tractor, the implement having working tools configured to engage with a ground in operation while the tractor is drawing the implement over a field; and a control system, comprising a control unit and a sensor arrangement connected to the control unit through a control bus, wherein the control unit is configured to determine a draft force applied to the implement through the draw bar from measurement signals detected by the sensor arrangement. The control system is configured to control operation of the agricultural system according to the method.

While the tractor is drawing or pulling the implement over the field the draft or draw force load applied to the draw bar/the implement is controlled. Different threshold limits are provided. In response to the present draft force derived from measurement signals detected by the sensor arrangement exceeding the respective threshold value, a warning signal and a switching control signal, respectively, are provided depending on which of the different threshold values is exceeded by the present draft force. A stepwise control process is implemented providing, in a first step, the warning signal to the user. If the higher second threshold is passed by the present draft force, the implement is switched to a field transport mode of operation in which the working tools are disengaged from the ground of the field by lifting-up the working tools. Such lifting-up of the working tools is done while the tractor is drawing or pulling the implement over the field. Thereby, damage to the implement, specifically the working tools, is avoided.

The situation in which the present draft force is exceeding the first draft force threshold may be referred to as high load. If the present draft force is exceeding the second draft force threshold, such situation may be referred to as overload.

The method may further comprise at least one of the following: determining in real time, by the control unit, that a first real time-detected draft force derived from the first present measurement signals detected by the sensor arrangement is higher than the first draft force threshold determining; and determining in real time, by the control unit, that a second real time-detected draft force derived from second present measurement signals detected by the sensor arrangement is higher than the second draft force threshold. The determining may be a real-time determining. In general, the wording "real time" is a level of responsiveness of the control system that a user senses as sufficiently immediate. The real-time process may enable the control system of the agricultural system to keep up with some external process, for example, to respond to the changing draft force conditions by providing the warning signal and/or the switch control signal as the draft force conditions constantly change.

The method may further comprise determining, by the control unit, that a present third draft force derived from third measurement signals detected by the sensor arrangement is lower than the second draft force threshold, and, in response to the determining, the following may be provided: providing a re-switch control signal in the control unit; outputting the re-switch control signal to an implement control unit, and in response to the re-switch control signal, re-switching operation of the implement from the field transport mode of operation into the normal mode of operation in which the working tools engage with the ground while the tractor is drawing the implement over the field by lowering the working tools. After it is determined that the present draft force is no longer exceeding the second draft force threshold, the implement may be switched back to the normal mode of operation. Such re-switching may be done while the tractor is continuously moving over the field.

The method may comprise the switching operation of the implement into the field transport mode of operation which is different from a non-field transport mode of operation. The transport mode of operation may be different for the implement on the field and off the field, for example, on the street. For example, the different modes of operation for transport may be different with regard to a lifting height and/or lifting position of the working tools. In an embodiment, the working tools may be lifted-up higher in the non-field transport mode of operation than in the field transport mode of operation. It may be provided in an embodiment that the working tools are secured in the non-field transport position which makes it necessary to unsecure the working tools for moving them into the normal mode of operation in which the working tools are engaging with the ground. Differently, the working tools may not be secured in the field transport mode of operation. Therefore, in some alternative embodiment, there may be alternative switching processes for switching the mode of operation of the implement from the transport mode to the normal mode of operation.

The method may further comprise, in a multidimensional graphical representation of measurement components detected by the sensor arrangement: a multidimensional graphical representation of measurement components detected by the sensor arrangement, a multidimensional area of normal load representing draft forces being smaller than or equal to the first draft force threshold; a multidimensional area of overload separated from multidimensional area of normal load and representing draft forces being higher than the second draft force threshold; and a multidimensional area of high load representing draft forces being higher than the first draft force threshold and smaller than or equal to the second draft force threshold, the multidimensional area of high load separating the multidimensional area of normal load from the multidimensional area of overload. The measurement signals detected by the sensor arrangement will span or spread over a multidimensional space (of measurement signals). For example, measurement signals detected for two measurement parameters or components will span or spread over a two-dimensional space. Within such space of measurement signals there will be sub-spaces which refer, for example, to the first or second draft force threshold being exceeded or not. In the exemplary embodiment of having a two-dimensional space spanned by the measurement components or parameter, the two-dimensional sub-spaces may be graphically presented in an x-y-diagram.

The method may further comprise at least one of the following: determining, by the control unit, that a draft force component of the present first draft force is higher than a first draft force component threshold, wherein the draft force component is determined along a direction of force which is provided with an angle $\alpha$ with $\alpha>0$ to a driving direction; and determining, by the control unit, that a draft force component of the present second draft force is higher than a second draft force component threshold, wherein the draft force component is determined along a direction of force which is provided with an angle $\beta$ with $\beta>0$ to the driving direction, wherein $\beta=\alpha$ or $\beta\neq\alpha$. One or more draft force components not being parallel with the drawing or pulling direction may be determined and analyzed for detecting different draw or pull load situations such as normal draft force load, high draft force load and overload draft force. In such cases, the first and second draft force threshold may be provided as a first and second draft force component threshold, respectively, being a draft force component along the direction of force assigned to the angle $\alpha$ or $\beta$.

The method may further comprise: providing force sensor elements in different locations of the draw bar, the different locations including at least one connecting point in which the draw bar is connected to a support member of the implement; measuring force values by each of the force sensor elements; and determining, by the control unit, the present first draft force and the second present draft force from the measured force values. One or more of the force sensor elements may be provided in pivot points in which the drawbar is pivotally connected to the support member of the implement or the tractor (hitch point). The support member may be part of a frame of the implement. With regard to the pivot points, there may be direct connection between the drawbar and the support member of the implement.

The method may comprise: providing a left force sensor element at a left connecting point in which the draw bar is connected to the support member of the implement on the left hand side: providing a right force sensor element at a right connecting point in which the draw bar is connected to the support member of the implement on the right hand side; and providing a hitch point force sensor element in a tractor-implement connecting point. The left and the right force sensor elements are provided on opposite sides of the implement with regard to a middle section of the drawbar. Detecting different draw or pull forces for the left and the right force sensor elements may indicate that a resulting draw force applied to the implement/the draw bar is not parallel to the driving direction. An angle for the direction of force for such resulting draw or pull force may be determined from the sensor signals. Having different draw forces detected by the left and the right force sensor element, in general, may indicate misuse drawing or pulling force. The first or the second draft force thresholds may indicate or may be assigned to different level or degrees with regard to the misuse pulling or draft force.

The method may comprise providing a pressure sensor element at a draw bar hydraulic cylinder configured to measure a weight transfer force. The pressure sensor which, in an alternative embodiment, can be a force sensor may be configured to determine a vertical load applied at the tractor/machine coupling point. In case the draw bar is not used in floating position (floating position=draft force only, in the direction of the draw bar from a side view), then the machine can apply a vertical force or load at the coupling point (weight transfer) which need to be known to not lead to phantom overload detected by the control unit. Indeed, overload is mostly in regards to the horizontal plane.

The method may comprise: providing a force sensor element in the hitch point; providing an angel sensor element configured to measure, for the draw bar, an angle of orientation with respect to the driving direction; measuring force values by the force sensor elements; measuring angle values by the angle sensor; and determining, by the control unit, the present first draft force and the second present draft force from the measured force values and the measured angle values. There is an alternative sensor arrangement design for determining misalignment of the (resulting) draft force and the driving direction. The wording misalignment, as used here, in general, may refer to the direction of force and the driving direction being not parallel.

The method may comprise providing, in the control unit, display signals indicating at least one of the following: the first measurement signals, the second measurement signals, the first draft force threshold, the second draft force threshold, the present first draft force, and the present second draft force; and outputting the display signals to the user through the output device connected to the control unit.

The method may comprise providing, in the control unit, log data indicating at least one of the following: the first measurement signals, the second measurement signals, the first draft force threshold, the second draft force threshold, the present first draft force, the present second draft force, the warning signal, and the switching control signal; and storing the log data in a log data file in a memory accessible by the control unit. The log data in the log data file may be processed or analyzed for determining operation information, for example, statistical information such as damage calculation which would allow estimating some remaining life time of the implement and predictive maintenance. Mechanical structures are known to fail due to fatigue loads repeated very high number of time during the life time of the machine. These fatigue loads which can lead to mechanical failures have most often much lower values than maximum values being accepted by the material before permanent deviations (fatigue stress<yield stress). By monitoring real time the load level and its duration, it may be determined how much fatigue is into the structural parts and, by comparison with fatigue data's of the material used to build the frame, advise on predictive maintenance actions to avoid fatigue failures in operation, or determine which ratio of total lifetime the machine have reached.

In addition or as an alternative to providing force sensors integrated at connection points between different parts, one or more pressure sensors may be applied when a hydraulic cylinder is used. Also, in addition or a san alternative, a strain gauge may be placed at key points and under relevant direction on parts of the drawbar and/or other parts of the implement on which loads are applied. By knowing the section and material of these parts and measuring the micro-extension under relevant direction of these parts under load, it can be calculated corresponding stress and forces applied to the structural parts of the drawbar and/or the implement.

In an alternative embodiment, there may be an operation of a control mechanism in a control system of an agricultural system or machine. The control system may be configured to receive use input for setting operation parameters of the implement such as a working depth control for the working tools. Such user input may be received through user terminal which may be provided in the tractor. There may be an original setting received by user input, the original setting referring to a working depth for the working tools. Following, the user may activate a control function "max performance setting" in order to maximize the machine (implement) performance while avoiding overloads. The control system, as described above, will check whether there is overload. The control system will override the original setting for the working depth to closest control parameters or value(s) avoiding overload. The machine keeps thus working in the high load area. The override setting is displayed to the user on the terminal connected to the control system.

The alternative embodiments described above with regard to the method for controlling operation of the agricultural system may apply to the agricultural system mutatis mutandis.

DESCRIPTION OF EMBODIMENTS

Figure 2:
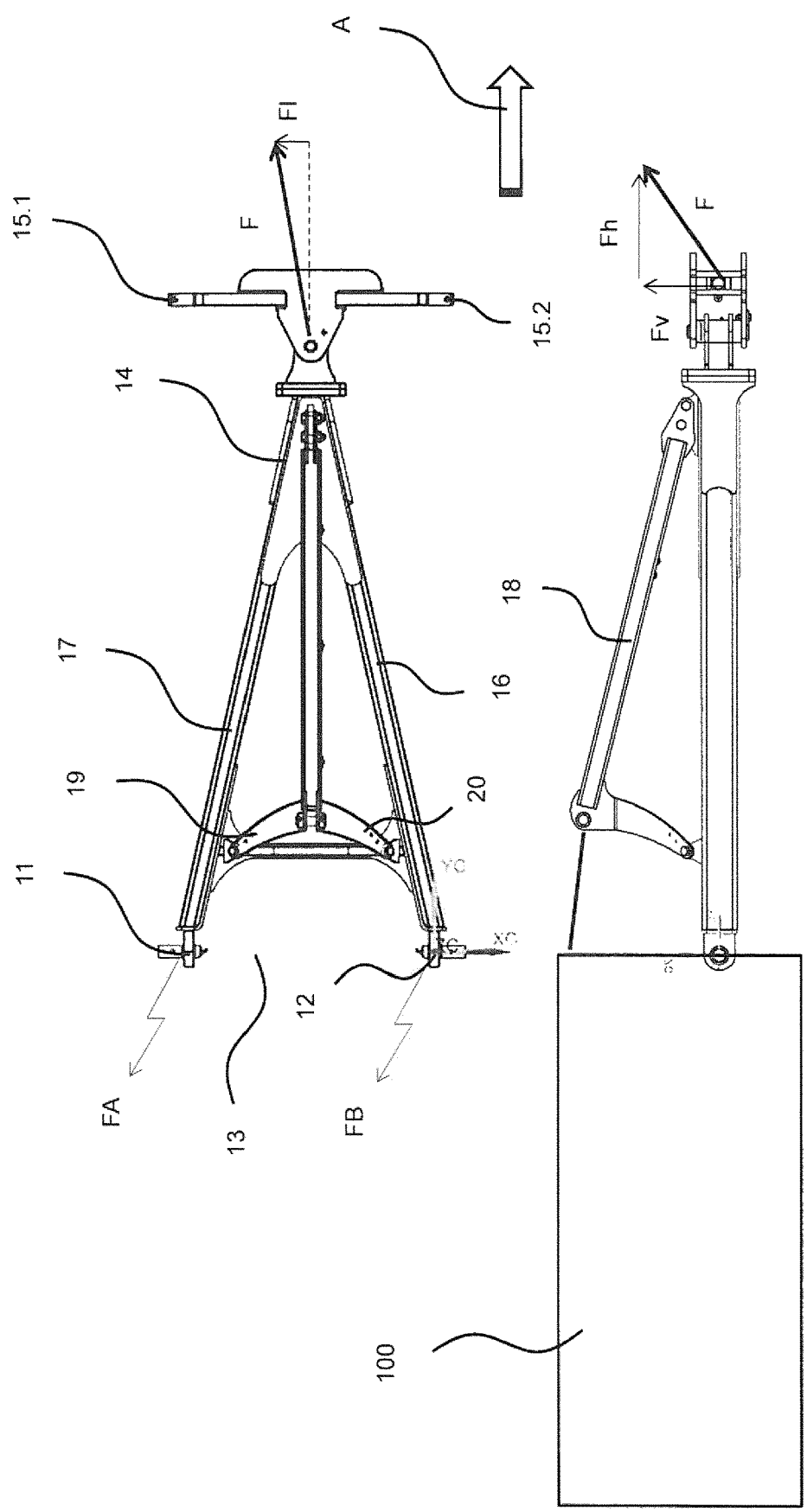
Figure 3:
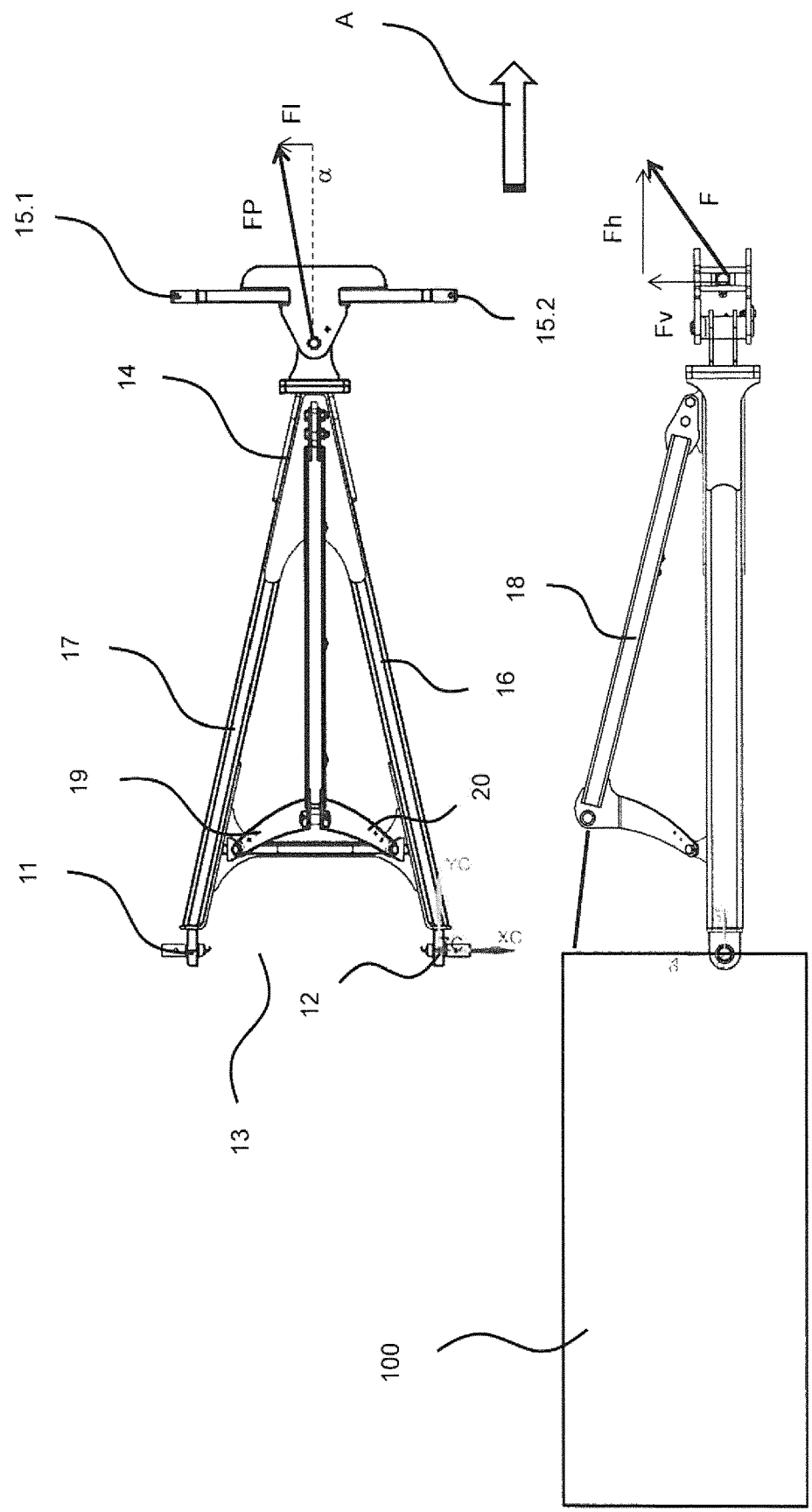
Figure 4:
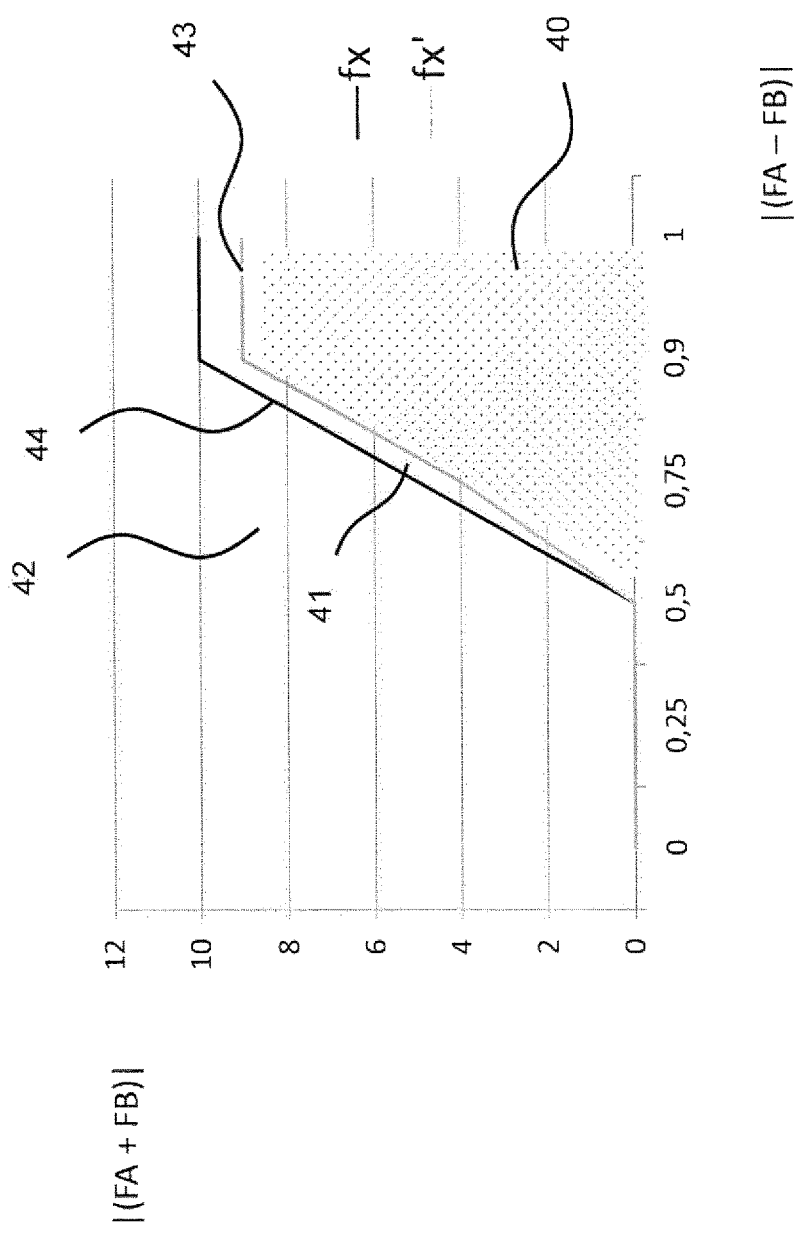
Figure 5:
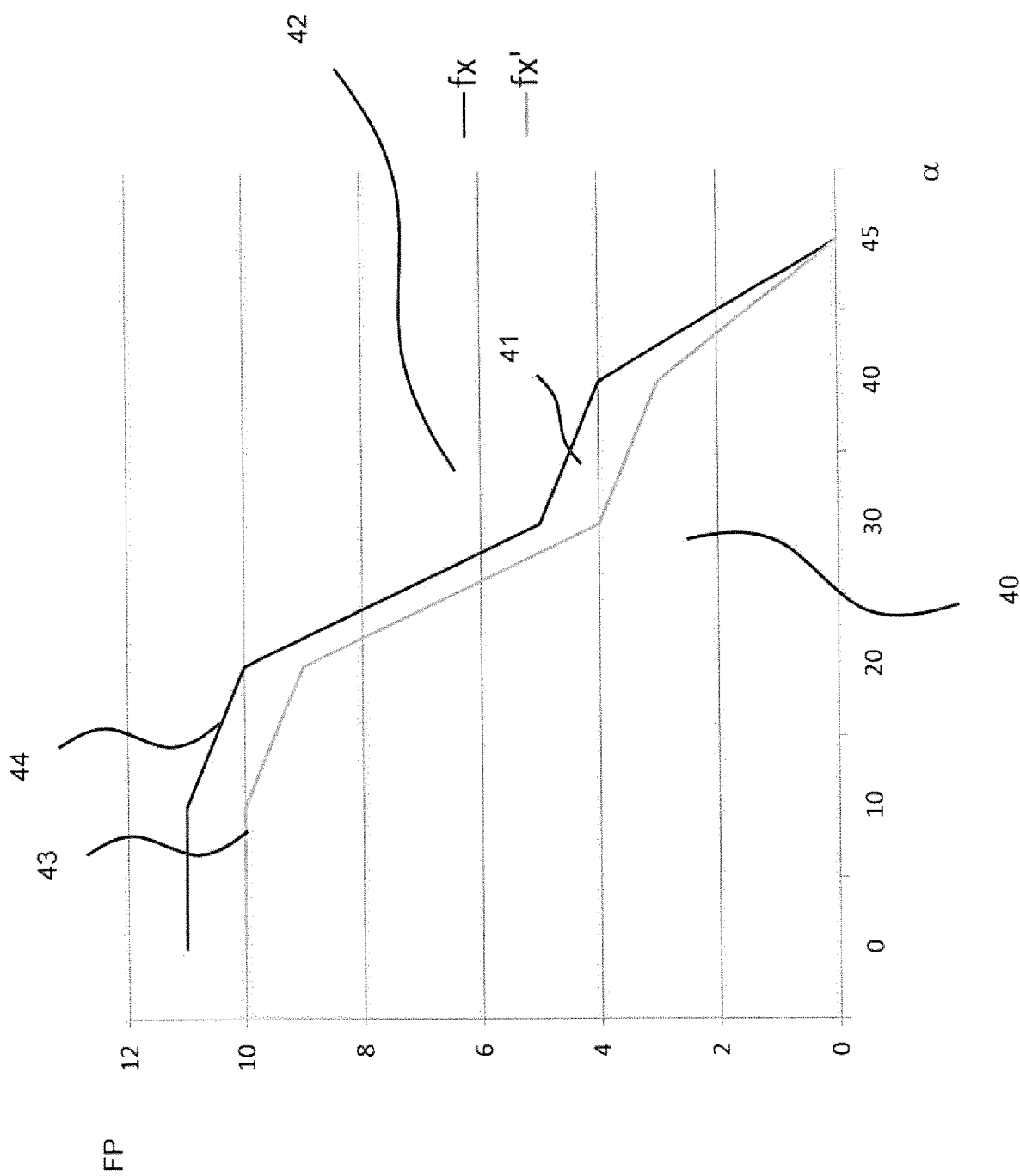
Figure 6:
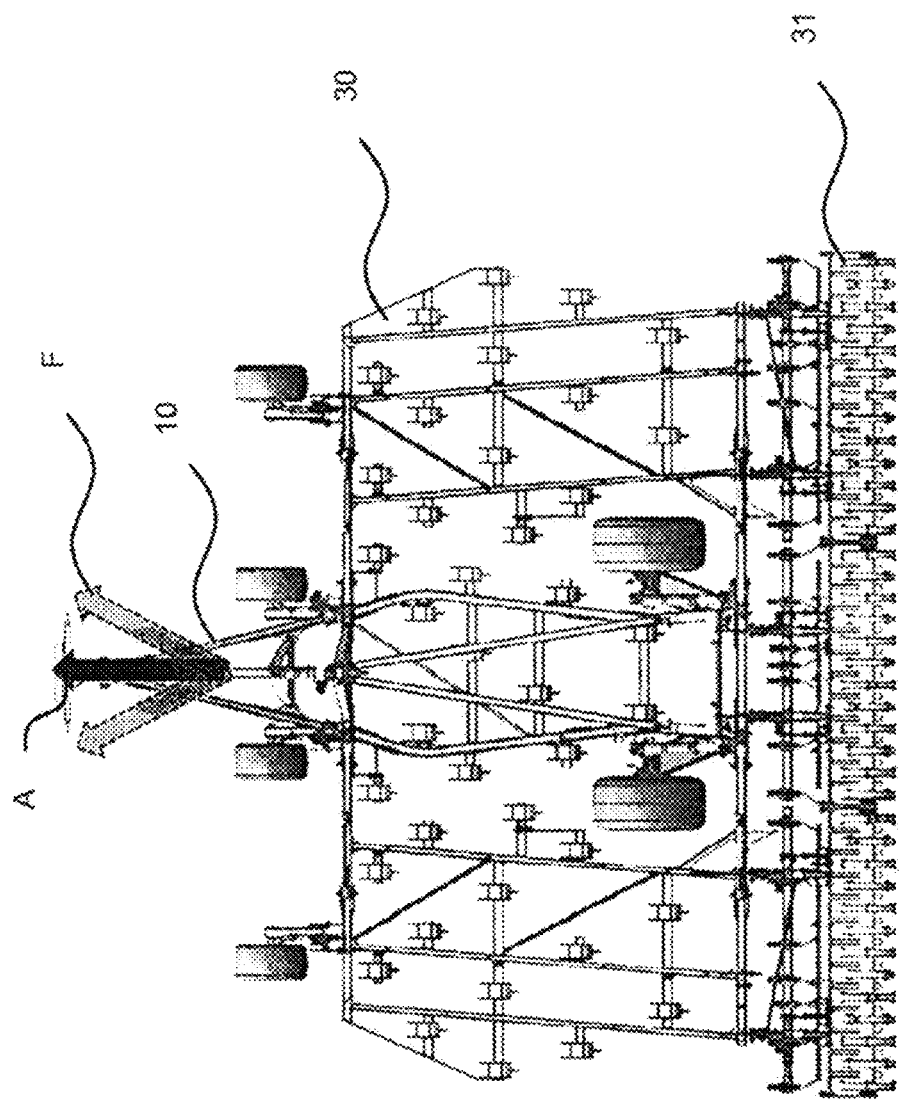
Figure 7:
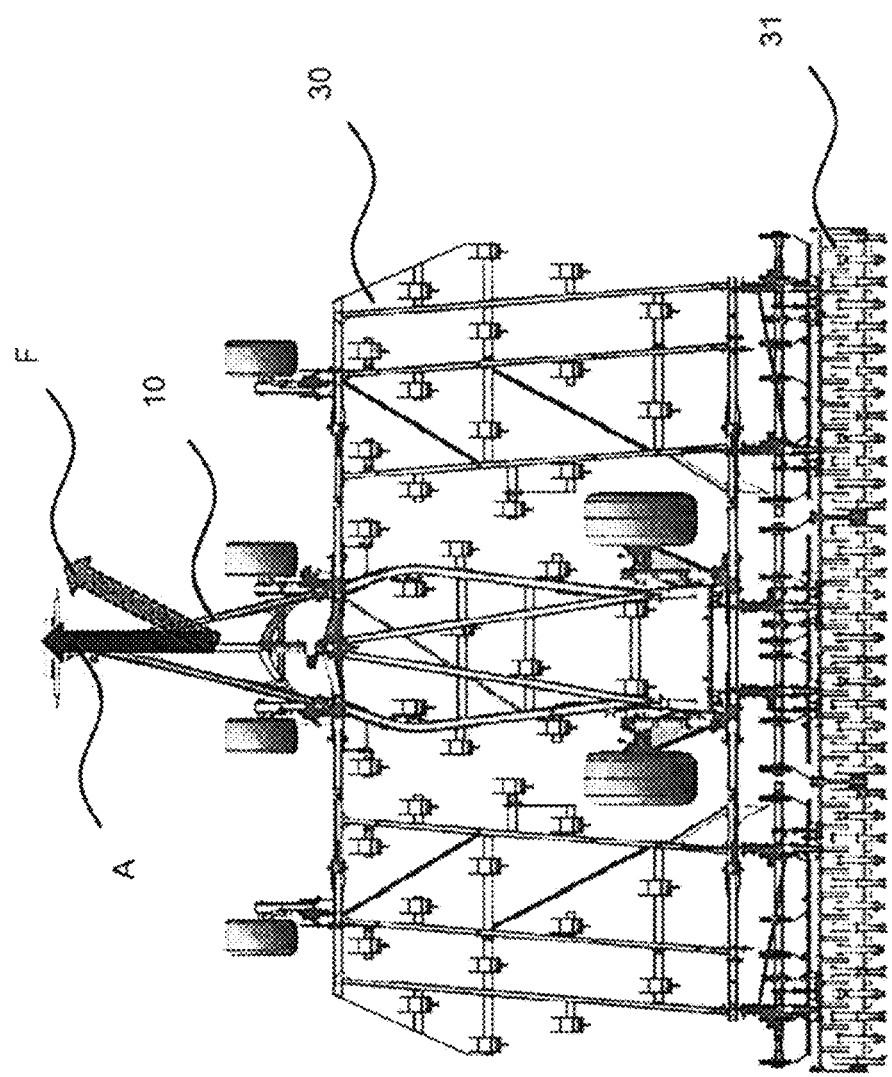
Figure 8:
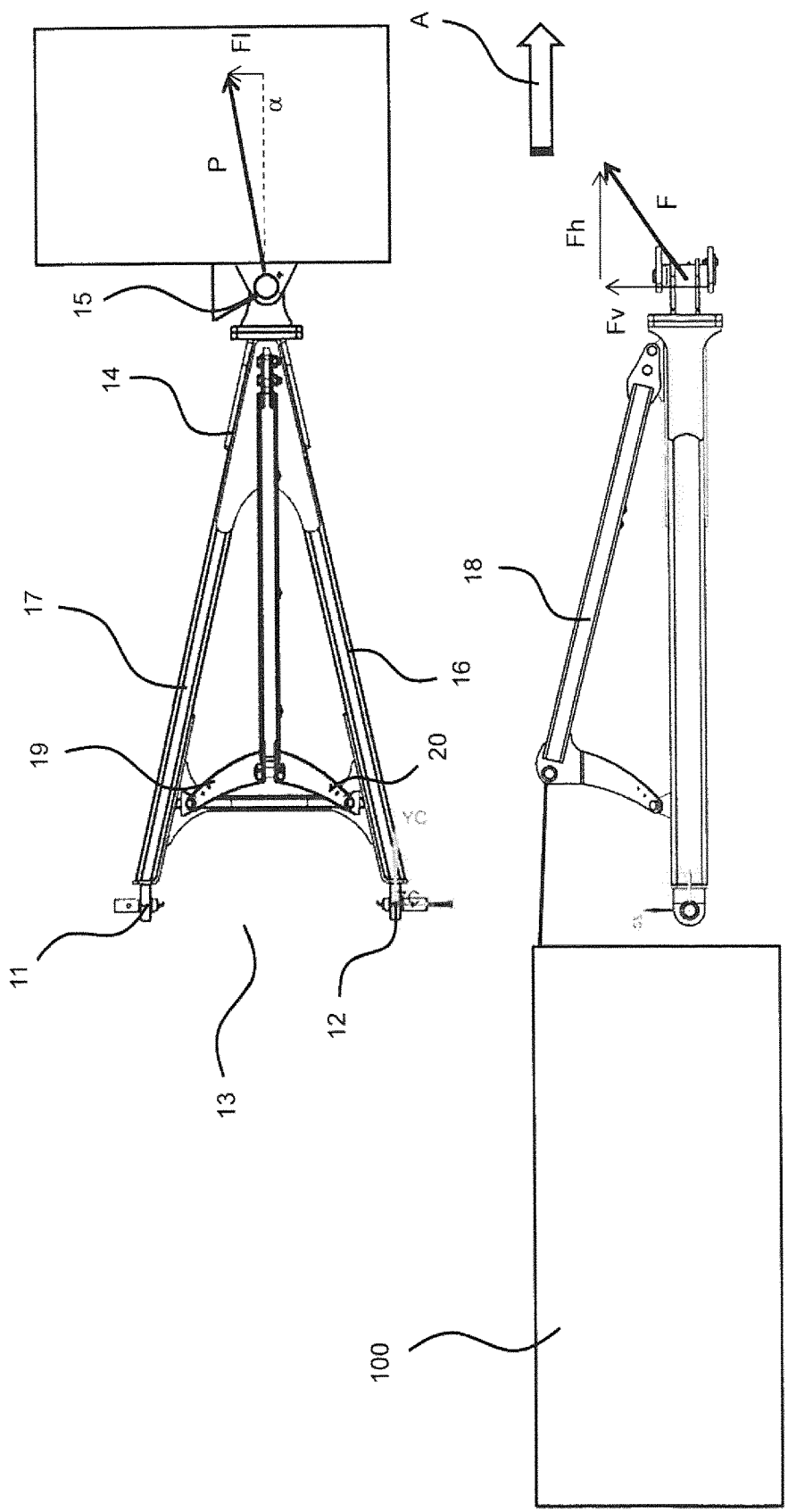
Figure 9:
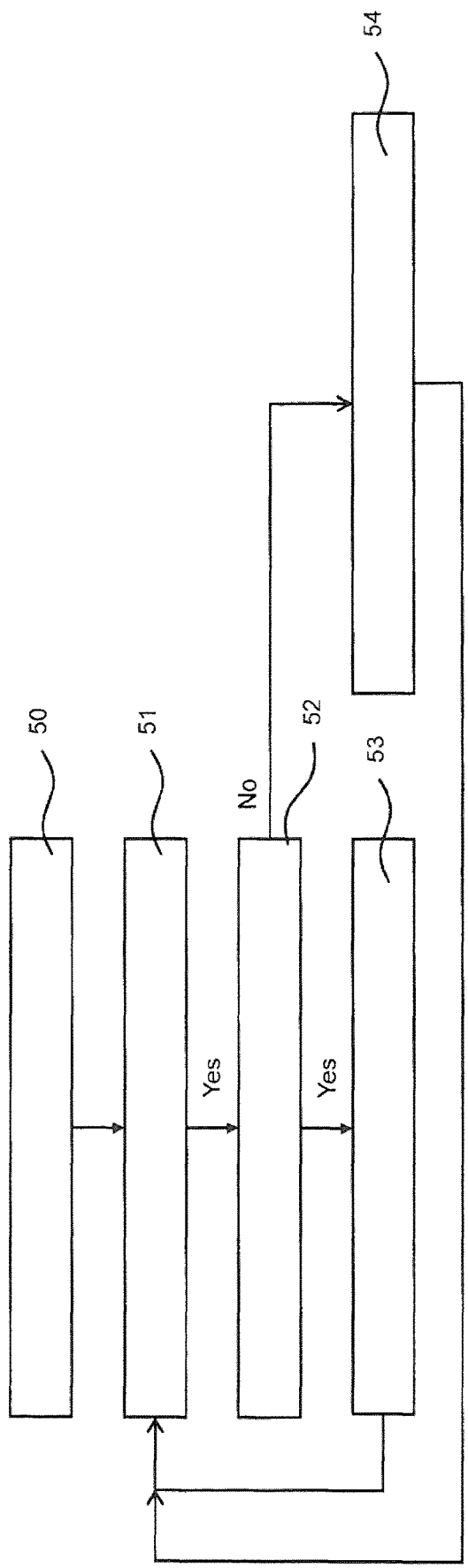

Following, further embodiments are described with reference to the figures. In the figures, show:

FIG. 1 a schematic block diagram of components of a control system provided in an agricultural system provided with a tractor and a tractor drawn implement;

FIG. 2 a schematic representation of a drawbar connected to a pulling point from above an aside view;

FIG. 3 a schematic representation of another drawbar connected to a pulling point from above and in a side view;

FIG. 4 a graphical representation for draft forces measured on a left and a right-hand side of the draw bar in the arrangement shown in FIG. 2;

FIG. 5 a graphical representation of a draft force measured at the pulling point in the arrangement shown in FIG. 3 independence on an angle between the direction of force and the driving direction;

FIG. 6 a schematic representation of an implement provided as a cultivator;

FIG. 7 a schematic representation of the cultivator in FIG. 6;

FIG. 8 a schematic representation of a further drawbar connected to a pulling point from above an aside view; and FIG. 9 a schematic block diagram.

FIG. 1 shows a schematic block diagram of components of a control system provided for use in an agricultural system comprising a tractor and an implement drawn by the tractor. The implement is provided with working tools (see FIGS. 6 and 7) which in operation will engage with the ground and/or some agricultural product while the tractor is pulling the implement over the field. The implement, for example, may be a cultivator, a windrower, a seeder, a mower, a disc harrow, a tine harrow, or a plough.

The working tools, as it is known as such in the art, may be moved between a working position in which the working tools are engaging with the ground and/or an agricultural product, and a non-working position in which the working tools are disengaged from the ground and/or the agricultural product. There may be more than one working position. Also, there may a plurality of non-working positions, the working tools in each of the non-working positions being disengaged from the ground and/or the agricultural product. At least some of the non-working positions may be referred to as transport positions. Such one or more transport positions may be applied to the working tools for pulling the implement either over the field or on a street in a transport situation.

The arrangement shown in FIG. 1 is provided with a sensor arrangement 1 comprising one or more sensor elements 1.1, . . . , 1.n. The sensor elements 1.1, . . . , 1.n are each configured to detect one or more measurement components or parameters (measurement signals) such as force, pressure, angle and/or speed. The sensor elements 1.1, . . . , 1.n are connected to a control unit 2 which is to receive and process sensor or measurement signals. According to the exemplary embodiment in FIG. 1 the control unit 2 is connected to a display unit 3 and memory unit 4. Through the display unit 3 information signals may be displayed or outputted to the user of the agricultural system, for example, the driver of the tractor. In the memory unit 4 data may be stored by the control unit 2, for example, log data which provide information about the operation of the agricultural machine. Such log data provided in one or more log data files may be retrieved to derive statistic data or information about the operation of the agricultural machine by the control unit 2.

The components of the control system are, specifically for data transmission, functionally connected to a control bus 5 of the agricultural machine such as a CAN bus. For example, the display unit 3 and/or the memory unit 4 may be connected to the control unit 2 directly, thereby, establishing data transmission not through the control bus 5, but direct data exchange.

There may be one or more additional components 6 provided with the control system of the agricultural system. One or more of the sensor elements 1.1, . . . , 1.n may be assigned a local control unit 7 which, for example, may implement controlling of the respective sensor element in the process of detecting measurement signals. Also, the local control unit 7, for the assigned sensor element, may control data transmission through the control bus 5.

While the tractor is pulling the implement over the field measurement signals may be detected by the sensor elements 1.1, . . . , 1.n which allow to calculate or determine a draft or pull force which is applied to the implement through a draw bar (see FIGS. 2 and 3).

FIGS. 2 and 3 show different arrangements with a draw bar 10 which is to be connected with the implement 100 at two pivot points 11, 12 on a proximal side 13. On a distal side 14 the draw bar 10 is connected to the tractor at hitch points 15.1, 15.2. The draw bar 10 is provided with two side bar elements 16, 17 and a hydraulic cylinder 18 pivotally connected to the two side bar elements 16, 17 through support members 19, 20.

Referring to the arrangement in FIG. 2, sensor elements 1.1, 1.2, 1.3 are provided in the pivot points 11, 12 and the hitch points 15.1, 15.2, all sensor elements 1.1, 1.2, 1.3 being force sensor elements. A resulting draft force F may be provided with a vertical draft force component FV and a horizontal draft force component FH. Depending on the operation scenario on the field, the resulting draft force F may be non-parallel to the driving direction (see arrow A in FIG. 2).

The forces (measurement signals) FA, FB detected in the pivot points 11, 12 by the sensor elements will span or spread over a two-dimensional space of forces (FA+FB), (FA−FB) which is depicted in FIG. 4. A sub-area 40 of normal mode of operation (normal load, normal draft force) is separated from a sub-area 41 of high load and a sub-area 42 of overload. The sub-areas 40, 41, 42 are separated by a first threshold draft force 43 and a second draft force threshold 44. In operation, if the control unit 2 determines from the measurement signal detected by the sensor elements 1.1, 1.2, 1.3 that the present draft force is exceeding the first draft force threshold 43, it will generate a warning signal which is to be outputted by the display unit 3. As an alternative or in addition, an acoustic warning signal may be outputted to the user. If in further operation the control unit 2 is determining that the present draft force derived from the measurement signals is exceeding the second draft force threshold 44 the working tools of the implement are disengaged with the ground by lifting-up the working tools in a field transport position. If later the control unit 2 determines that the present draft force is no longer in the sub-area 42, the working tools shall be moved back to the normal working position in which the working tools are engaging with the ground.

Referring to FIGS. 3 and 5, an alternative embodiment is shown. There are two sensor elements 1.3 and 1.4 provided in the hitch points 15.1, 15.2 or in a position adjacent to the hitch points 15.1, 15.2. One sensor element is configured to detect a force (force sensor element). The other sensor element is an angle sensor configured to detect an angle between the driving detection A and a middle line of the drawbar 10. In FIG. 3 such angle is depicted by $\alpha$.

In addition or as an alternative to providing force sensors integrated at connection points between different parts, one or more pressure sensors may be applied when a hydraulic cylinder is used. Also, in addition or as an alternative, a strain gauge may be placed at key points and under relevant direction on parts of the drawbar 10 and/or other parts of the implement 100 on which loads are applied. By knowing the section and material of these parts and measuring the micro-extension under relevant direction of these parts under load, it can be calculated corresponding stress and forces applied to the structural parts of the drawbar 10 and/or the implement 100.

As shown in FIG. 5, again, the measurement components or parameters determined, namely force FP and angle $\alpha$, in a graphical representation will span or spread over a two-dimensional space or area provided with the sub-areas 40, 41, 42 (normal load, high load, overload). Depending on where the present draft force determined by the control unit 2 is located within the area depicted in the graphical representation in FIG. 5, the control unit 2 will be responding. For example, the warning signal is generated and outputted if the present draft force is determined to be in the sub-area 41.

FIGS. 6 and 7 show a top view of an implement which is a cultivator 30 provided with a plurality of working tools 31 which are moveable between at least one working position in which the working tools 31 are engaging with the ground and one or more non-working positions in which the working tools 31 are disengaged from the ground. At the drawbar 10 a resulting force F may be determined to be parallel or non-parallel with the driving direction A depending on present working conditions.

FIG. 8 shows a schematic representation of a further drawbar connected to a pulling point from above an aside view. In FIG. 8, for the same features the same reference numerals are applied like in FIGS. 2 and 3. Different from the arrangements in FIGS. 2 and 3, there is a single hitch point 15.

FIG. 9 shows a schematic block diagram regarding an operation of a control mechanism in a control system of an agricultural system or machine, for example, the control system shown in FIG. 1. As it is known as such for agricultural systems comprising an implement, a control system may be provided, the control system configured to receive use input for setting operation parameters of the implement such as a working depth control for the working tools 31. Such user input may be received through user terminal which may be provided in the tractor.

According to FIG. 9, there may be an original setting 50 received by user input, the original setting referring to a working depth for the working tools 31. Following, the user may activate a control function "max performance setting" in order to maximize the machine (implement) performance while avoiding overloads (step 51).

In step 52, the control system will check whether there is overload.

The control system will override the original setting for the working depth to the closest value avoiding overloads (step 53). The machine keeps thus working in the high load area. The override setting is displayed to the user on the terminal (step 54).

The features disclosed in this specification, the figures and/or the claims may be material for the realization of the invention in its various embodiments, taken in isolation or in various combinations thereof.

REFERENCE SIGNS

1.1, . . . , 1.n sensor elements
2 control unit
3 display unit
4 memory unit
5 control bus
6 further component
7 local control unit
10 draw bar
11, 12 pivot points
13 proximal side
14 distal side
15 single hitch point
15.1, 15.2 hitch points
16, 17 side bar elements 16, 17
18 hydraulic cylinder
19, 20 support members
30 cultivator
31 working tools
40, 41, 42 graphical sub-area
43 first threshold
44 second threshold
50, . . . , 54 block diagram elements
100 implement

The invention claimed is:

1. A method for controlling operation of an agricultural system, comprising
   a tractor;
   an implement hitched through a draw bar to the tractor, the implement having working tools configured to engage with a ground and/or an agricultural product in operation while the tractor is drawing the implement over a field; and
   a control system, comprising a control unit and a sensor arrangement connected to the control unit through a control bus, wherein the control unit is configured to determine a draft force applied to the implement through the draw bar from measurement signals detected by the sensor arrangement;
the method comprising:
   providing a first draft force threshold in the control unit;
   providing a second draft force threshold in the control unit, the second draft force threshold being assigned a draft force which is higher than a draft force assigned to the first draft force threshold;
   operating the implement in a normal mode of operation in which the working tools engage with the ground and/or the agricultural product while the tractor is drawing the implement over the field;
   determining, by the control unit, that a present first draft force derived from first measurement signals detected by the sensor arrangement is higher than the first draft force threshold;
   in response to the determining,
      providing a warning signal in the control unit, and
      outputting the warning signal to a user through an output device connected to the control unit;
   determining, by the control unit, that a present second draft force derived from second measurement signals detected by the sensor arrangement is higher than the second draft force threshold; and
   in response to the determining,
      providing a switch control signal in the control unit;
      outputting the switch control signal to an implement control unit; and
      in response to the switch control signal, switching operation of the implement into a field transport mode of operation in which the working tools are disengaged from the ground and/or the agricultural product by lifting up the working tools while the tractor is drawing the implement over the field.

2. The method according to claim 1, wherein the determining further comprises at least one of the following:
   determining in real time, by the control unit, that a first real time-detected draft force derived from the first present measurement signals detected by the sensor arrangement is higher than the first draft force threshold determining; and
   determining in real time, by the control unit, that a second real time-detected draft force derived from second present measurement signals detected by the sensor arrangement is higher than the second draft force threshold.

3. The method according to claim 2, further comprising:
   determining, by the control unit, that a present third draft force derived from third measurement signals detected by the sensor arrangement is lower than the second draft force threshold; and
   in response to the determining,
      providing a re-switch control signal in the control unit;
      outputting the re-switch control signal to an implement control unit; and
      in response to the re-switch control signal, re-switching operation of the implement from the field transport mode of operation into the normal mode of operation in which the working tools engage with the ground and/or the agricultural product while the tractor is drawing the implement over the field by lowering the working tools.

4. The method according to claim 1, further comprising:
   determining, by the control unit, that a present third draft force derived from third measurement signals detected by the sensor arrangement is lower than the second draft force threshold; and
   in response to the determining,
      providing a re-switch control signal in the control unit;
      outputting the re-switch control signal to an implement control unit; and
      in response to the re-switch control signal, re-switching operation of the implement from the field transport mode of operation into the normal mode of operation in which the working tools engage with the ground and/or the agricultural product while the tractor is drawing the implement over the field by lowering the working tools.

5. The method according to claim 1, wherein the switching comprises switching operation of the implement into the field transport mode of operation which is different from a non-field transport mode of operation.

6. The method according to claim 1, further comprising, in a multidimensional graphical representation of measurement components detected by the sensor arrangement,
a multidimensional area of normal load representing draft forces being smaller than or equal to the first draft force threshold;
a multidimensional area of overload separated from multidimensional area of normal load and representing draft forces being higher than the second draft force threshold; and
a multidimensional area of high load representing draft forces being higher than the first draft force threshold and smaller than or equal to the second draft force threshold, the multidimensional area of high load separating the multidimensional area of normal load from the multidimensional area of overload.

7. The method according to claim 1, further comprising at least one of:
determining, by the control unit, that a draft force component of the present first draft force is higher than a first draft force component threshold, wherein the draft force component is determined along a direction of force which is provided with an angle $\alpha$ with $\alpha>0$ to a driving direction; and
determining, by the control unit, that a draft force component of the present second draft force is higher than a second draft force component threshold, wherein the draft force component is determined along a direction of force which is provided with an angle $\beta$ with $\beta>0$ to the driving direction, wherein $\beta=\alpha$ or $\beta\neq\alpha$.

8. The method according to claim 1, further comprising:
providing force sensor elements in different locations of the draw bar, the different locations including at least one connecting point in which the draw bar is connected to a support member of the implement;
measuring force values by each of the force sensor elements; and
determining, by the control unit, the present first draft force and the second present draft force from the measured force values.

9. The method according to claim 8, further comprising:
providing a left force sensor element at a left connecting point in which the draw bar is connected to the support member of the implement on the left hand side;
providing a right force sensor element at a right connecting point in which the draw bar is connected to the support member of the implement on the right hand side; and
providing a hitch point force sensor element in a tractor-implement connecting point.

10. The method according to claim 9, further comprising providing a pressure sensor element at a draw bar hydraulic cylinder configured to measure a weight transfer force.

11. The method according to claim 8, further comprising providing a pressure sensor element at a draw bar hydraulic cylinder configured to measure a weight transfer force.

12. The method according to claim 1, further comprising:
providing a force sensor element in the hitch point;
providing an angel sensor element configured to measure, for the draw bar, an angle of orientation with respect to the driving direction;
measuring force values by the force sensor elements;
measuring angle values by the angle sensor; and
determining, by the control unit, the present first draft force and the second present draft force from the measured force values and the measured angle values.

13. The method according to claim 1, further comprising:
providing, in the control unit, display signals indicating at least one of the following: the first measurement signals, the second measurement signals, the first draft force threshold, the second draft force threshold, the present first draft force, and the present second draft force; and
outputting the display signals to the user through the output device connected to the control unit.

14. The method according to claim 1, further comprising:
providing, in the control unit, log data indicating at least one of the following: the first measurement signals, the second measurement signals, the first draft force threshold, the second draft force threshold, the present first draft force, the present second draft force, the warning signal, and the switching control signal; and
storing the log data in a log data file in a memory accessible by the control unit.

15. An agricultural system, comprising
a tractor;
an implement hitched through a draw bar to the tractor, the implement having working tools configured to engage with a ground and/or an agricultural product in operation while the tractor is drawing the implement over a field; and
a control system, comprising a control unit and a sensor arrangement connected to the control unit through a control bus, wherein the control unit is configured to determine a draft force applied to the implement through the draw bar from measurement signals detected by the sensor arrangement;
wherein the control system is configured to control operation of the agricultural system and is operative to:
provide a first draft force threshold within the control unit;
provide a second draft force threshold within the control unit, the second draft force threshold being assigned a draft force which is higher than a draft force assigned to the first draft force threshold;
operate the implement in a normal mode of operation in which the working tools engage with the ground and/or the agricultural product while the tractor is drawing the implement over the field;
wherein the control unit is further configured to:
determine that a present first draft force derived from first measurement signals detected by the sensor arrangement is higher than the first draft force threshold; and
in response to the determination, provide a warning signal in the control unit, and output the warning signal to a user through an output device connected to the control unit;
wherein the control unit is further configured to:
determine that a present second draft force derived from second measurement signals detected by the sensor arrangement is higher than the second draft force threshold; and
in response to the determination, provide a switch control signal in the control unit, and output the switch control signal to an implement control unit; and
wherein the control system is further configured to, in response to the switch control signal, switch operation of the implement into a field transport mode of operation in which the working tools are disengaged from the ground and/or the agricultural product by lifting up the working tools while the tractor is drawing the implement over the field.

\* \* \* \* \*